(12) United States Patent
Kirkham et al.

(10) Patent No.: US 9,152,308 B2
(45) Date of Patent: *Oct. 6, 2015

(54) ORGANIZING GRAPHICAL REPRESENTATIONS ON COMPUTING DEVICES

(71) Applicant: Google Inc., Mountain View, CA (US)

(72) Inventors: Stephen Kirkham, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,427

(22) Filed: Apr. 10, 2014

(65) Prior Publication Data

US 2014/0223353 A1    Aug. 7, 2014

Related U.S. Application Data

(63) Continuation of application No. 13/890,584, filed on May 9, 2013, now Pat. No. 8,701,042, which is a continuation of application No. 13/525,021, filed on Jun. 15, 2012, now Pat. No. 8,464,180.

(51) Int. Cl.
*G06F 3/0481* (2013.01)
*G06F 3/0484* (2013.01)
*H04M 1/725* (2006.01)

(52) U.S. Cl.
CPC ........ *G06F 3/04842* (2013.01); *G06F 3/04817* (2013.01); *H04M 1/72586* (2013.01); *H04M 2250/22* (2013.01)

(58) Field of Classification Search
CPC ... G06F 3/0481; G06F 9/4443; G06F 3/0482; G06F 3/04842
See application file for complete search history.

(56) References Cited

U.S. PATENT DOCUMENTS 6,609,146 B1    8/2003    Slotznick
6,633,315 B1    10/2003   Sobeski et al.
(Continued)

FOREIGN PATENT DOCUMENTS

| JP | 10-139133 | 5/1998 |
| KR | 2003-0068310 | 8/2003 |
| KR | 10-2010-0030968 | 3/2010 |

OTHER PUBLICATIONS

CNET Reviews, Auto-sorting apps on your jailbroken iPhone. (http://reviews.cnet.com/8301-19512_7-10384810-233.html) retrieved Jun. 22, 2012.

(Continued)

*Primary Examiner* — Phenuel Salomon
(74) *Attorney, Agent, or Firm* — Fish & Richardson P.C.

(57) ABSTRACT

Methods, systems, and apparatus, including computer programs encoded on a computer storage medium, for identifying a current configuration of graphical representations displayed in a user interface presented by a computing device, each of the graphical representations being associated with a respective computer-executable application, determining at least one usage signal corresponding to each of the graphical representations, the usage signal reflecting user interaction with the respective associated computer-executable application, determining one or more success metrics indicative of an efficiency of the current configuration of graphical representations, generating, using an optimization technique, a modified configuration of graphical representations based on the usage signals and the one or more success metrics, and presenting, in the user interface, at least a portion of the modified configuration of graphical representations.

20 Claims, 8 Drawing Sheets

(56) References Cited

U.S. PATENT DOCUMENTS

| | | |
|---|---|---|
| 7,257,777 B1 | 8/2007 | Kanevsky et al. |
| 7,619,991 B2 | 11/2009 | Wylie et al. |
| 8,055,602 B2 | 11/2011 | Tirpak et al. |
| 8,464,180 B1 | 6/2013 | Kirkham et al. |
| 8,701,042 B2 | 4/2014 | Kirkham et al. |
| 2005/0057435 A1* | 3/2005 | Su .................................. 345/1.3 |
| 2007/0085759 A1* | 4/2007 | Lee et al. ........................ 345/1.1 |
| 2007/0136405 A1* | 6/2007 | Weinstein et al. ............ 708/130 |
| 2008/0046840 A1 | 2/2008 | Melton et al. |
| 2008/0134043 A1* | 6/2008 | Georgis et al. ................ 715/733 |
| 2008/0316183 A1* | 12/2008 | Westerman et al. ........... 345/173 |
| 2009/0132377 A1 | 5/2009 | Thompson et al. |
| 2009/0150807 A1 | 6/2009 | George et al. |
| 2009/0199134 A1 | 8/2009 | Murayama |
| 2009/0210814 A1 | 8/2009 | Agrusa et al. |
| 2009/0213088 A1* | 8/2009 | Hardy et al. ................... 345/173 |
| 2010/0062811 A1 | 3/2010 | Park et al. |
| 2010/0231534 A1* | 9/2010 | Chaudhri et al. ............. 345/173 |
| 2011/0018695 A1* | 1/2011 | Bells et al. .................. 340/407.2 |
| 2011/0072492 A1 | 3/2011 | Mohler et al. |
| 2011/0122081 A1* | 5/2011 | Kushler ........................ 345/173 |
| 2011/0126095 A1* | 5/2011 | Brock et al. ................... 715/702 |
| 2011/0191611 A1 | 8/2011 | Boni Ang Gaw Go et al. |
| 2011/0258542 A1* | 10/2011 | Kenney et al. ................. 715/702 |
| 2011/0321051 A1 | 12/2011 | Rastogi |
| 2012/0047509 A1 | 2/2012 | Ben-Itzhak |

OTHER PUBLICATIONS

Office Action issued in Korean Application No. 10-2013-0067599 on Nov. 16, 2014, 9 pages (with English translation).

* cited by examiner

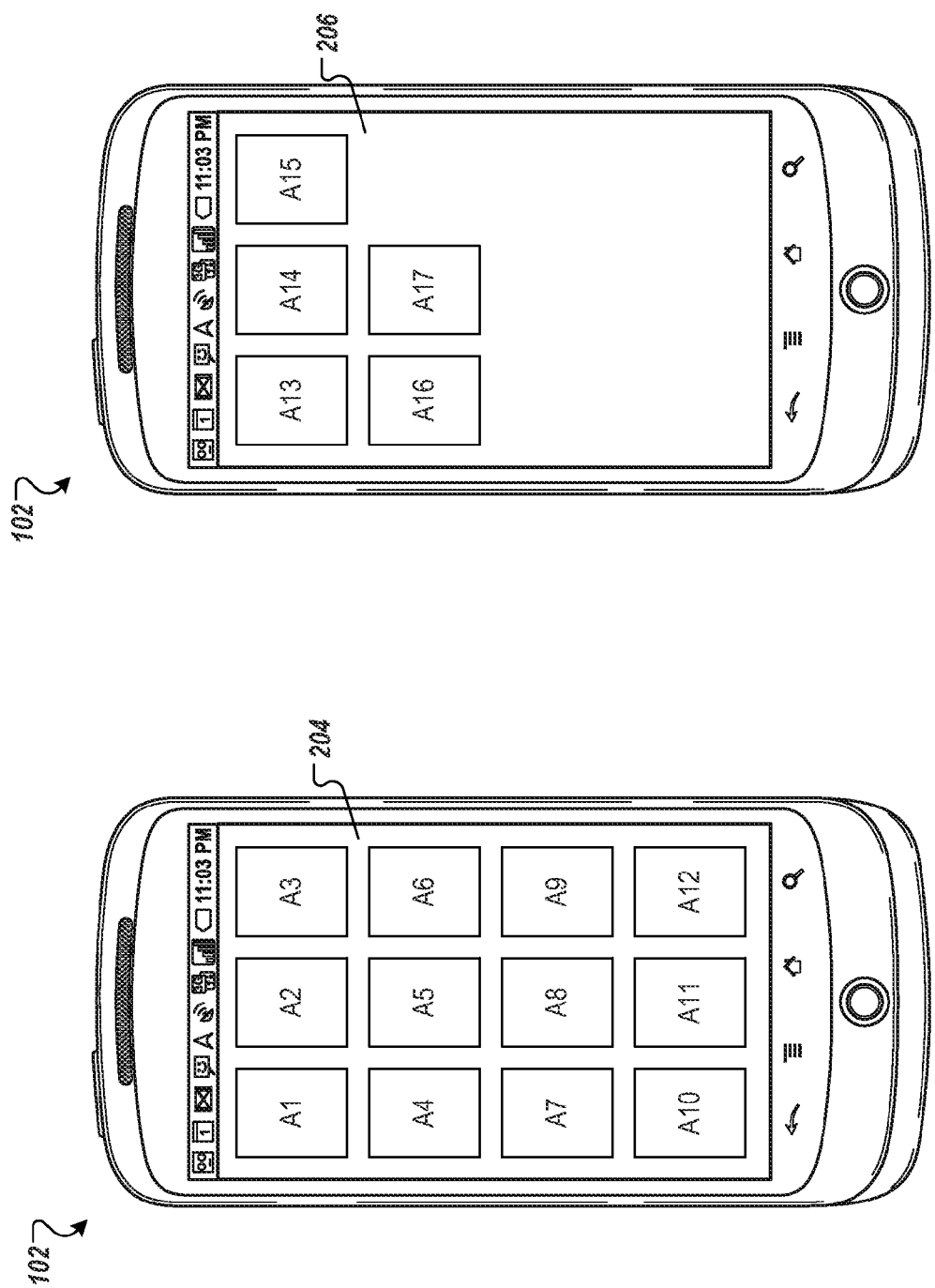

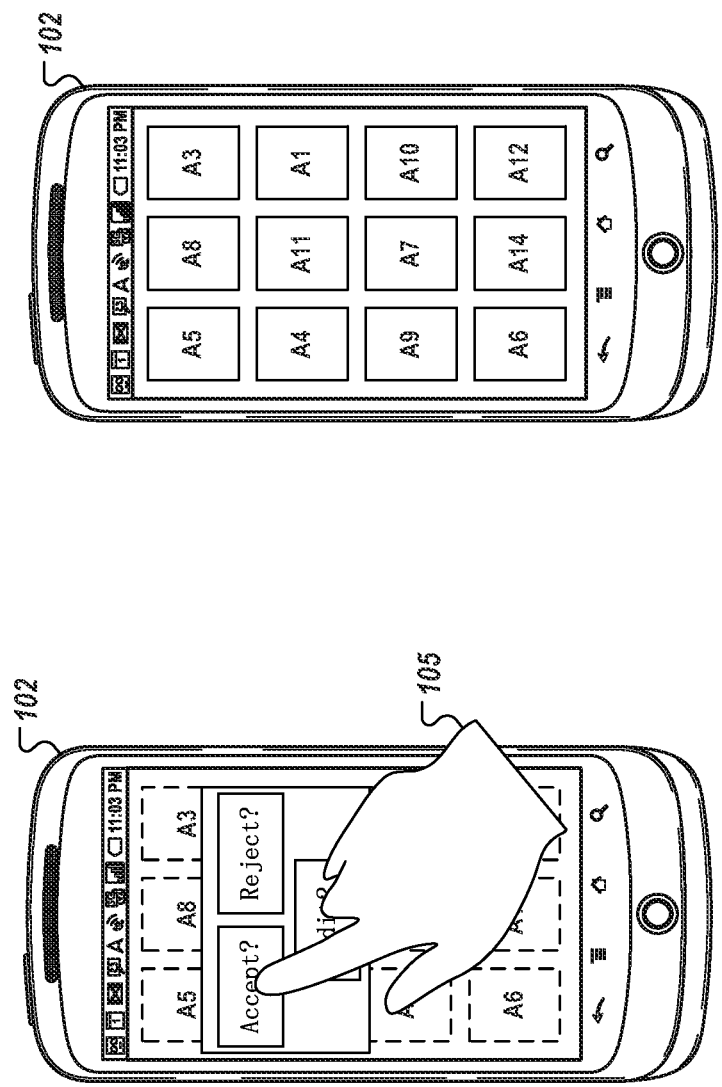

ORGANIZING GRAPHICAL REPRESENTATIONS ON COMPUTING DEVICES

CROSS-REFERENCE TO RELATED APPLICATION

This application is a continuation of U.S. patent application Ser. No. 13/890,584, filed May 9, 2013, and entitled "ORGANIZING GRAPHICAL REPRESENTATIONS ON COMPUTING DEVICES" which is a continuation of U.S. patent application Ser. No. 13/525,021, filed Jun. 15, 2012, and entitled "ORGANIZING GRAPHICAL REPRESENTATIONS ON COMPUTING DEVICES," now U.S. Pat. No. 8,464,180 issued Jun. 11, 2013, the contents of which are incorporated herein by reference in their entirety.

BACKGROUND

Mobile computing continues to grow quickly as mobile computing devices, such as smartphones and tablets, add more power and features. Users of such devices may now access various services on the Internet and download applications from third party server systems. The applications can include, for example, gaming applications, electronic mail applications, text messaging applications, social media applications, music and video applications, and similar such applications. In some cases, graphical representations of applications (e.g., icons) are displayed on screens of computing devices.

SUMMARY

Innovative aspects of the subject matter described in this specification may be embodied in methods that include actions of identifying a current configuration of graphical representations displayed in a user interface presented by a computing device, each of the graphical representations being associated with a respective computer-executable application, determining at least one usage signal corresponding to each of the graphical representations, the usage signal reflecting user interaction with the respective associated computer-executable application, determining one or more success metrics indicative of an efficiency of the current configuration of graphical representations, generating, using an optimization technique, a modified configuration of graphical representations based on the usage signals and the one or more success metrics, and presenting by the computing device, in the user interface, at least a portion of the modified configuration of graphical representations. Other embodiments of these aspects include corresponding systems, apparatus, and computer programs, configured to perform the actions of the methods, encoded on computer storage devices.

These and other embodiments may each optionally include one or more of the following features. For instance, the user interface includes one or more screens, and wherein identifying a current configuration of graphical representations comprises identifying spatial relationships between positions of the graphical representations on the screens; determining at least one usage signal includes recording, with the computing device, usage data describing user interaction with an application executing on the computing device; determining at least one usage signal further includes transmitting, from the computing device, the usage data to a server system; determining at least one usage signal comprises receiving the at least one usage signal at the computing device, from a server system; the at least one usage signal includes an aggregated usage signal based on usage data generated by multiple users; the at least one usage signal is selected from the group consisting of: frequency of use, interaction time, interaction frequency, navigation rate, and order of use; the at least one usage signal includes a weighted combination of two or more usage signals; determining one or more success metrics includes recording, with the computing device, usage data describing user interaction with the user interface; the one or more success metrics include at least one of nominal navigation rate and interstitial time; the at least one usage signal includes a first usage signal and the optimization technique includes: determining, based on the first usage signal, a priority score attributed to each computer-executable application graphically represented in the user interface, determining a priority order of the graphical representations according to the priority scores, and modifying the priority order based on a second usage signal; actions further include modifying the priority order based on metadata associated with the computer-executable applications; generating a modified configuration of graphical representations includes generating the modified configuration when at least one success metric of the one or more success metrics degrades below a predetermined threshold; generating a modified configuration of graphical representations comprises generating the modified configuration in response to a user instruction; generating the modified configuration of graphical representations includes removing one or more graphical representations from the user interface; actions further include re-organizing the graphical representations in the user interface based on the modified configuration of graphical representations; actions further include prompting a user to accept the modified configuration of graphical representations; and generating the modified configuration of graphical representations includes: generating a modified configuration at predetermined time intervals, monitoring a difference between the modified configuration and the current configuration, and implementing the modified configuration when the difference exceeds a predetermined threshold.

Particular embodiments of the subject matter described in this specification may be implemented so as to realize one or more of the following advantages. In some examples, manual reordering of user interface icons by a user is avoided through systems and methods that determine a more efficient configuration for the icons, based on usage signals generated by the user. The more efficient configuration can reduce the amount of navigational input required by the user to operate the device, thus saving the user both time and effort. Further, in some examples, computer memory and graphical space in the user interface can be reclaimed by removing rarely used applications from the computing device and the corresponding application icons from the user interface.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 2A and 2B depict a home screen and a secondary screen, respectively, of an example mobile computing device including example application icons in a current configuration.

FIGS. 5A-5F depict sequential illustrations of a user interacting with an example mobile computing device according to one or more implementations of the present disclosure.

Like reference numbers represent corresponding parts throughout.

DETAILED DESCRIPTION

Implementations of the present disclosure are generally directed to organizing graphical representations displayed in graphical user interfaces (GUIs) of computing devices. In some examples, graphical representations can include application icons and/or widgets. The application icons can, for example, provide a graphical representation of respective computer program applications that are installed and executable on a computing device. In particular, implementations of the present disclosure can include determining, based on one or more usage signals, a modified configuration for a plurality of graphical representations in one or more screens displayed on a computing device. In some examples, the modified configuration can be provided as a spatial configuration where a position within the screens is specified for each graphical representation. In some examples, the usage signals can be determined based on user interaction with each of the applications and/or widgets represented by the graphical representations and/or with the one or more screens displayed on the computing device. In some implementations, a current configuration (e.g., an initial configuration, or a previously modified configuration) can be permanently or temporarily set to the modified configuration. In some implementations, the current configuration can be rolled back or can be maintained based on subsequent user interaction.

Figure 1:
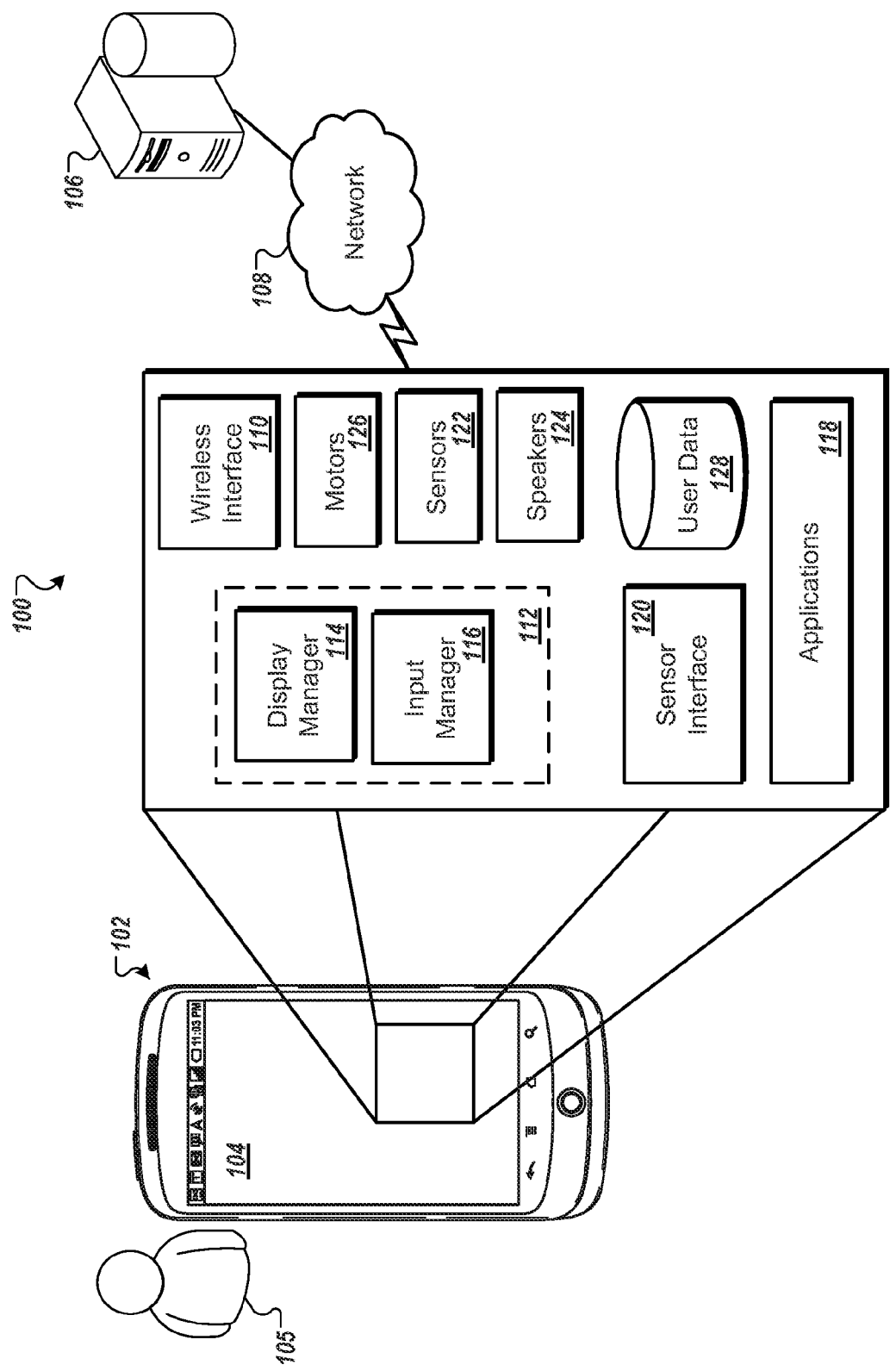
FIG. 1 depicts an example system that can execute implementations of the present disclosure.

FIG. 1 depicts an example system 100 that can execute implementations of the present disclosure. In general, the system 100 includes a mobile computing device 102 (e.g., a smartphone, a tablet computing device) with a touchscreen display 104. In some examples, the touchscreen display 104 can provide one or more GUIs for the mobile computing device 102. In some examples, and as discussed in further detail below, the touchscreen display can provide one or more screens on which graphical representations can be displayed to a user. A number of components within the mobile computing device 102 provide for interaction with the mobile computing device 102. For purposes of clarity, FIG. 1 shows certain example components of the mobile computing device 102. A user 105 can be a user of the mobile computing device 102.

In some implementations, the mobile computing device 102 can communicate with a server system 106 through a network 108 (e.g., using a wireless interface 110). The network 108 can be the Internet and/or a cellular network. For example, the mobile computing device 102 can direct telephone calls through a telephone network or through a data network using voice over internet protocol (VOIP). In addition, the mobile computing device 102 can transmit other forms of data over the internet, for example, data in the form of Hypertext Transfer Protocol (HTTP) requests that are directed at particular web sites. The mobile computing device 102 may receive responses, for example, in forms that can include, but are not limited to, a mark-up code for generating web pages, media files, and electronic messages.

A number of components running on one or more processors included in the mobile computing device 102 enable the user 105 to interact with the touchscreen display 104 to provide input and to receive visual and/or audible output. For example, an interface manager 112 can manage interaction with the touchscreen display 104, and includes a display manager 114 and an input manager 116. The display manager 114 can manage the information displayed to a user using the touchscreen display 104. For example, an operating system running on the mobile computing device 102 can use the display manager 114 to arbitrate access to the touchscreen display 104 for a number of applications 118 running on the mobile computing device 102. One or more sensors 122 are provided to sense movement of the mobile device 102. Example sensors 122 can include one or more accelerometers, a gyroscope and a compass. For example, a direction and speed of movement of the mobile device 102 can be determined using signals generated by the one or more sensors 122. The mobile device 102 can provide visual, haptic and/or audio feedback. For example, visual feedback can be provided using the display manager 114 to display graphical representations on the touchscreen display 104. As another example, audio feedback can be provided using one or more speakers 124. Haptic feedback can be provided by one or more motors 126 (e.g., to vibrate the mobile device 102).

In some implementations, the mobile computing device 102 enables the user 105 to interact with an application marketplace. An example application marketplace includes the Android Marketplace provided by Google Inc. In some implementations, the application marketplace can include a website that is hosted on one or more servers (e.g., the server system 106) and that is accessed using a computing device (e.g., the mobile computing device 102). In some implementations, the application marketplace can be provided as an application that is executed on a computing device (e.g., the mobile computing device 102), and that retrieves application information from one or more servers (e.g., the server system 106).

The application marketplace can advertise applications (e.g., the applications 118) that are available for download to and installation on the mobile computing device 102. For example, the user 105 of can interact with the application marketplace to view and/or find applications of interest. The user 105 can select a particular application (such as one of the applications 118) from the one or more displayed applications to download and install the selected application (such as one of the applications 118) on the mobile computing device 102.

Applications that have been downloaded and installed on the mobile computing device 102 can be represented as icons on a screen displayed in the touchscreen display 104. In some examples, the user 105 can execute an application by activating (e.g., tapping on) one of the icons in the GUI. For example, the user 105 can activate an icon by contacting (e.g., with a finger) a region of the touchscreen display 104 where the icon is displayed. In some examples, the GUI can include one or more pages, or screens, for presenting the icons to the user 105. When the GUI includes multiple screens, each screen can include a respective configuration or arrangement of one or more of the application icons. In some examples, one of the multiple GUI screens can be provided as a primary screen (e.g., a home screen).

In some examples, the user 105 can navigate between the multiple screens by interacting with the touchscreen 104. For example, the user 105 can contact the touchscreen 104 and perform a lateral sweeping motion (a "swipe") to navigate between screens. In some examples, the user 105 can also navigate within each screen. For example, if a screen includes additional space that extends beyond the provided display area, the user 105 can view the additional space by scrolling the screen. In some examples, scrolling can be accomplished by contacting the touchscreen 104 and performing an upwards or downwards dragging, or swiping motion.

FIGS. 2A and 2B depict a home screen 204 and a secondary screen 206, respectively, of an example mobile computing device 102 including example application icons in a current configuration. As shown, the home screen 204 includes icons A1-A12 and the secondary screen 206 includes icons A13-A15. The icons A1-A15 represent applications that have been downloaded (or otherwise transferred) to, and subsequently installed on, the mobile computing device 102. As shown, the icons A1-A15 are organized in a grid arrangement. In this example, the grid includes three columns and four rows. Accordingly, a total of twelve icons can be disposed on each screen. It is appreciated that other suitable icon arrangements can also be used. For example, other appropriate configurations can have more or less rows and/or columns than provided in the depicted example.

In the depicted example, the icons A1-A15 are displayed on the screens 204, 206 in a current configuration. The current configuration can be an initial configuration or a previously modified configuration. For example, the icons A1-A15 can be positioned in the grid based on the order in which the represented applications were downloaded to and installed on the mobile computing device 102. As another example, the icons A1-A15 can be positioned in the grid based on an order defined by the user 105 (e.g., the user manually arranging the icons). Other standard ordering schemes can be used for the initial configuration (e.g., alphabetical order, order of application file size, etc.). In some examples, the initial configuration is determined as a default order prescribed by a third party manufacturer or service provider. As discussed in further detail herein, the current configuration can be modified based on one or more usage signals.

Implementations of the present disclosure are directed to organizing graphical representations (e.g., icons, widgets) associated with applications displayed on one or more screens of a computing device. For example, implementations can include actions of determining, based on one or more usage signals, a modified configuration for a set of graphical representations (e.g., icons, widgets) in one or more screens, and implementing the modified configuration to re-organize a current configuration of the graphical representations. In some examples, usage signals can indicate how a user or a set of users interact with one or more applications graphically represented on screens of computing devices, and/or interact with screens of computing devices to navigate to applications. In some examples, usage data can be automatically collected by the computing device and/or a remote server system. In some examples, usage data can be collected in response to user input (e.g., a user request to collect usage data). In some examples, determining the modified configuration of graphical representations includes implementing an optimization technique based on a success metric, as discussed in further detail herein.

Example usage signals can include frequency of use, interaction time, interaction frequency, navigation rate, and order of use. In some examples, frequency of use can be provided as a measure of how often an application is accessed or opened over a particular time period (e.g., X times per time period). For example, if a user opens a text messaging application twice in one hour, the frequency of use signal associated with the application could be expressed as a raw numeric score of "two/hour," or simply "two." In some implementations, various weights, constants, and/or coefficients can be incorporated into the usage signal. In some implementations, a first application associated with a strong frequency of use signal (e.g., thirty times per day) can be prioritized over a second application associated with a weak frequency of use signal (e.g., ten times per day), because the first application is more frequently utilized by the user.

In some examples, interaction time can be provided as a measure of a length of time that a user interacts with a particular application. In some examples, the interaction time can be provided as an accumulated application runtime over a particular time period (e.g., X minutes per time period). In some examples, the interaction time can be provided as an average application runtime over multiple uses (e.g., X minutes on average per use). In some implementations, a first application associated with a strong interaction time signal (e.g., two hours per day, or one hour per use) can be prioritized over a second application associated with a relatively weaker interaction time signal (e.g., ten minutes per day, or two minutes per use), because the first application is utilized more extensively by the user.

In some examples, interaction frequency can be provided as a measure of interactions between the user and an application. In some examples, interaction frequency can reflect how often the user interacts with an application over a particular time period (e.g., X interactions per time period). For example, a user can interact with an application by providing user input (e.g., using a touchscreen or other type of input device to make selections or provide commands). For example, a user can interact with a media player application by selecting a song or a playlist from a music library and issuing a command to play the selected song or playlist. In some examples, interaction frequency can reflect how often the application interacts with the user. For example, the application can provide notifications to the user. Such notifications can be provided as "push notifications" that are displayed to the user, for example, in a pop-up window and/or audible alarms.

In some examples, the interaction frequency can be expressed in terms of a quality or importance ratio. For instance, and by way of example, an application can provide ten notifications, push notifications for example, to a user, but the user only responds to one of the notifications. Consequently, the interaction frequency signal associated with the application may be relatively weak, because the user was generally unresponsive to notifications provided by the application. In some implementations, a first application associated with a strong interaction frequency signal (e.g., twenty times per day) is prioritized over a second application associated with a weak interaction frequency signal (e.g., three times per day), because the user has more frequent interaction with the first application.

For purposes of clarification, frequency of use and interaction frequency can be illustrated with reference to a first application and a second application. For example, a user can initiate execution of the first application ten times during a particular day, and interact with the first application two times during the particular day. The user can initiate execution of the second application three times during the particular day, and interact with the second application twenty times during the particular day. Accordingly, although the frequency of use is higher for the first application than the second application, the user more frequently interacts with the second application. Consequently, and although the frequency of use is higher for the first application than the second application, the second application could be determined to be more significant to the user.

In some examples, navigation rate is a measure of the average user input required to access a particular application. For example, navigation rate can be expressed as the average number of times a user passes through a screen to reach a particular application icon (e.g., the average number of "lateral swipes"). Other types of user input can also be considered in determining the navigation rate usage signal (e.g., scrolling and clicking). For example, if the application icons are grouped into folders, the number of times a user enters and exits a folder can be accounted for in the navigation rate signal.

In some examples, order of use is a measure of how often a user accesses two or more applications in a certain order during a particular time period. For example, and with reference to FIGS. 2A and 2B, a usage pattern can reflect that the user consistently opens the A1 application followed by the A16 application (e.g., multiple times a day). This usage pattern can be monitored and incorporated into the order of use signal. In some implementations, icons that represent applications known to be used in sequence by the user can be arranged near to one another (e.g., on the same page or in the same folder) in the modified configuration.

Figure 3B:
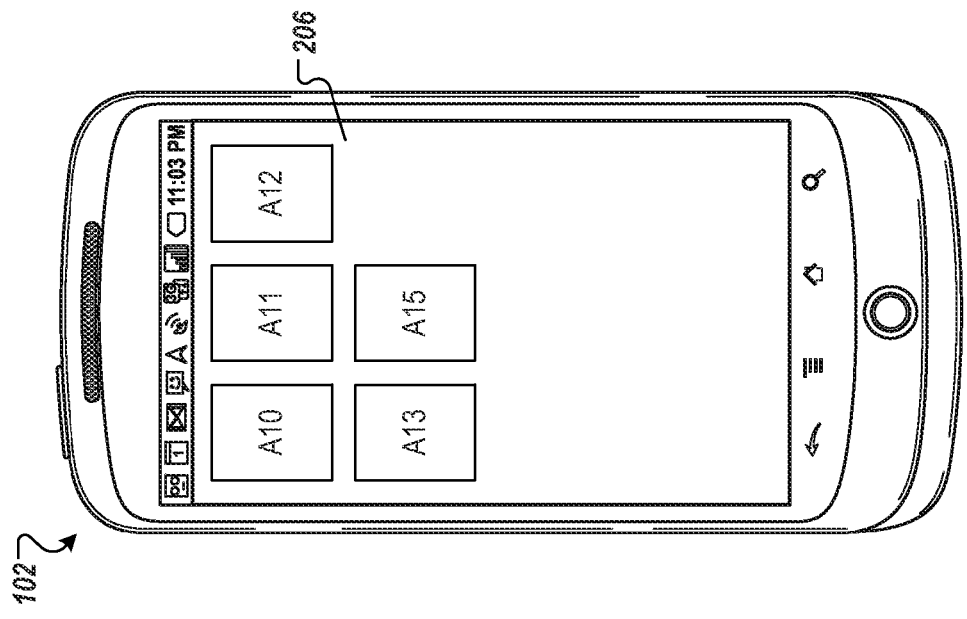
FIGS. 3A and 3B depict the home screen and the secondary screen, respectively, including the example application icons of FIGS. 2A and 2B in a modified configuration.
Figure 3A:
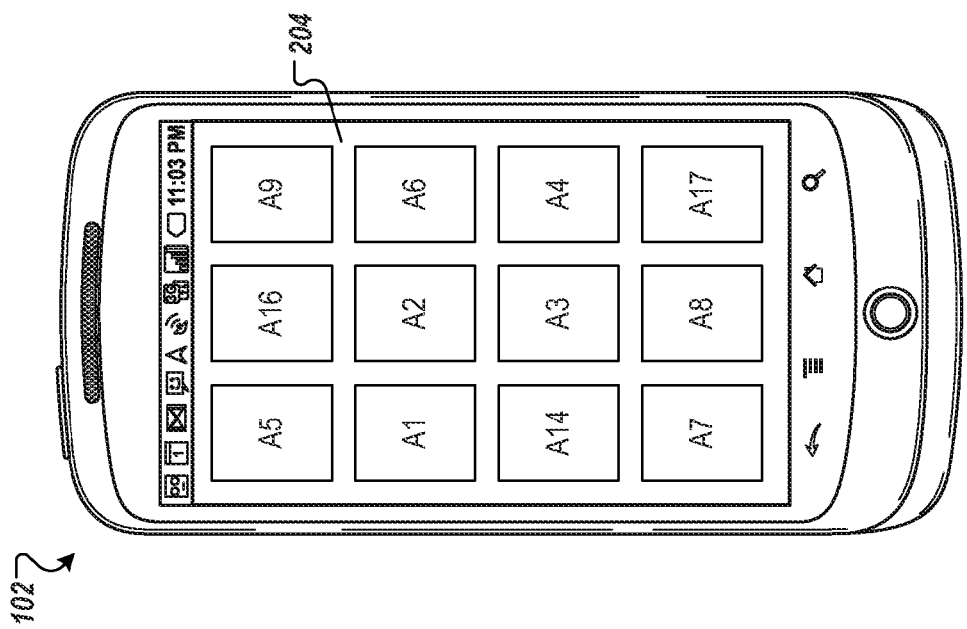

FIGS. 3A and 3B depict the home screen 204 and the secondary screen 206, respectively, including the example application icons of FIGS. 2A and 2B in a modified configuration. As noted above, one or more usage signals can be used to determine a modified configuration for a set of application icons. In some implementations, a priority score is attributed to each application that is represented by an icon in the GUI. Accordingly, in the modified configuration, the icons can be arranged in order of priority score. In some examples, the icons can be arranged from left to right, and from top to bottom, in a grid, based on the priority scores. Therefore, in this example, the icon A5, placed in the upper left-hand grid position on the home screen 204, would represent the highest priority application (e.g., have the highest priority score). The icon A15, placed in the last position on the secondary screen 206, would represent the lowest priority application (e.g., have the lowest priority score).

In some examples, the icon representing the highest priority application is placed in a "prominence position." The prominence position can be a region of the GUI page that is determined to be both easily visible and accessible to the user. For example, if the user is right handed, the prominence position may be located in a column of the grid on the right side of the GUI page. In some examples, the prominence position can be determined based on user input. For example, the user can select the prominence position through an interface of the computing device. In some examples, the prominence position is determined automatically, without user input, based on data collected by the computing device.

In some examples, the icon representing the highest priority application is placed in a "persistent display position." In some examples, a persistent display position can be provided in a region of the touchscreen display that includes a plurality of icons and that does not change from screen to screen. That is, icons in the persistent display position can be presented to the user in the same location across all of the screens. In some examples, the persistent display position is provided within a dock region located at the top, bottom, middle, or side of the display. In some examples, the dock region provides multiple persistent display positions including icons that are displayed regardless of which screen is being displayed.

In some implementations, the priority score can be determined based on one or more usage signals. For example, the priority score can be determined based on a particular usage signal or an aggregation of usage signals. By way of example, a particular usage signal can include frequency of use, and the icons A1-A15 can be arranged in order of priority score. In this example, and referring to FIGS. 3A and 3B, the icon A5 represents the application most frequently utilized by the user, and the icon A15 represents the application least frequently utilized by the user. In another example, the priority score can be determined as an aggregation of a plurality of usage signals (e.g., two or more usage signals). In some examples, influences of the respective usage signals can be weighted, such that certain usage signals are attributed more or less importance than other usage signals. In some examples, the usage signals are attributed equal weight.

In some implementations, an optimization technique can be used to determine the modified configuration. The optimization technique can provide a modified configuration of icons that improves the efficiency of the icon configuration with respect to one or more success metrics. In some implementations, the modified configuration of icons determined using the optimization technique is optimal with respect the success metrics. Example success metrics can include a nominal navigation rate and/or an interstitial time on a screen during navigations between screens. In some examples, the nominal navigation rate describes the average amount of navigational user input (e.g., traversing GUI screens and/or application folders) during a particular time period (e.g., average X number of "swipes" per day) required to find a graphical representation of interest (e.g., the number of swipes through screens to find an application icon). In some examples, the interstitial time on a screen reflects the amount of time a user pauses on one or more screens before finding a graphical representation of interest (e.g., time that the user is looking for a particular icon one each screen as the user navigates between screens in search of the icon). In some examples, in order to reduce the average amount of navigational user input and/or the interstitial time, the computing device can determine that certain graphical representations should be positioned near to one another (e.g., in adjacent grid positions on the same screen, in together in a folder). For example, and referring to FIG. 3A, usage signals can indicate that the applications respectively represented by icons A5 and A16 are both extensively utilized by the user and/or are often opened in sequence (e.g., one after another). Accordingly, in the modified configuration, the icons A5 and A16 are located near one another. Further, in addition to nominal navigation rate and the interstitial time, a modified configuration of icons can be determined using other suitable success metrics, or a combination of success metrics.

In some examples, application metadata can be used in the optimization technique to supplement the aggregated usage signals. For example, the computing device can determine that certain graphical representations should be positioned near one another, because they represent applications of a similar type or category (as identified by the metadata). Other types of metadata may also be considered (e.g., publisher, application name, etc.).

In some examples, the modified configuration of icons determined using the optimization technique can include less than the original number of icons. For example, the computing device can determine that certain graphical representations should be removed from the user interface, because they represent applications that are rarely utilized by the user. These rarely used applications can be identified based on the usage signals. In some cases, the computing device can suggest to the user (e.g., through notifications) that certain rarely used applications be deleted entirely from the device.

Figure 4:
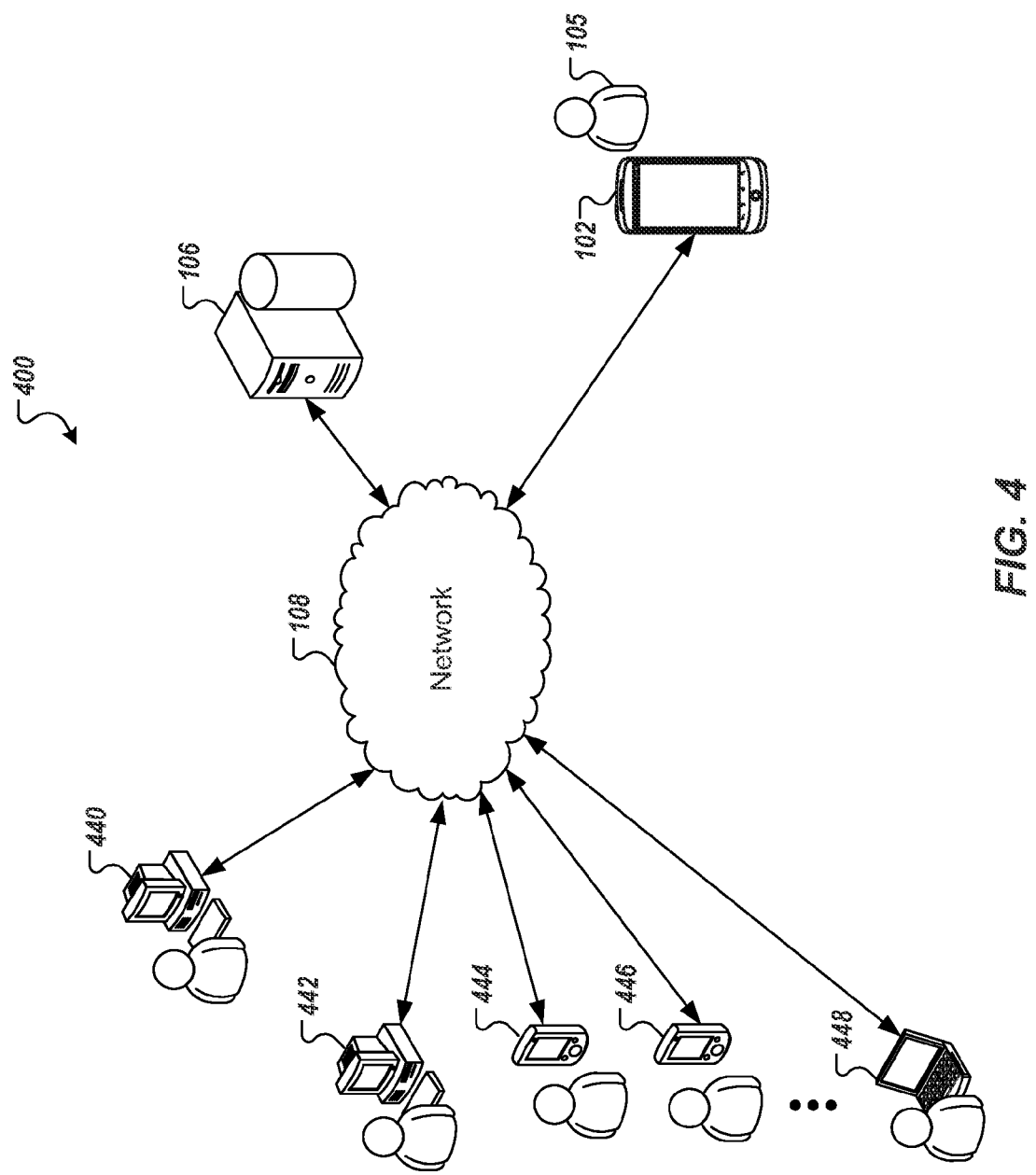
FIG. 4 depicts an example system that can execute implementations of the present disclosure, where a modified configuration is determined based on aggregated usage signals.

FIG. 4 depicts an example system 400 that can execute implementations of the present disclosure, where a modified configuration is determined based on aggregated usage signals. The example system 400 includes a number of user associated client computing devices 440-448 communicatively coupled to the server system 106 by the network 108. The system 400 also includes the computing device 102 associated with the user 105.

In some examples, users associated with the client computing devices 440-448 may opt into or opt out of providing usage information for particular applications to the server system 106. In some examples, usage information can be anonymously provided from each user. The server system 106 can be configured compute, aggregate and store usage signals based on the provided information. In some examples, the server system can determine an optimized configuration of icons based on the aggregated usage signals and can suggest the optimized configuration to the user 105, for example, as a suggested modified configuration. In some examples, the computing device 102 can receive one or more of the aggregated usage signals from the server system 106 and can determine a modified configuration based thereon (e.g., based on a priority score or an optimization technique as discussed above). In some examples, aggregated used signals can be used to propose a modified configuration to the computing device 102 when the computing device 102 is relatively new and/or little usage information associated with the particular user 105 has been collected. In some examples, the user 105 can request a modified configuration based on aggregated usage information, if the user has just purchased and activated the computing device 102 and/or if the user 105 is interested in how other users arrange graphical representations. As another example, the user 105 can request a modified configuration based on aggregated usage information, if the user has just downloaded a new application, has performed a system restore, and/or has opted not to have their own usage information collected by the computing device 102. In some examples, the user 105 can opt to provide usage information to the network 106 (e.g., in exchange for receiving proposed modified configurations based on usage information from other users).

In some implementations, re-organization of a current configuration of icons can be initiated by a user. For example, the user can provide a command through a user interface that initiates the determination of a modified configuration, as discussed herein. In some examples, the user can be prompted to initiate a re-organization. For example, the computing device can automatically determine an appropriate modified configuration, as discussed herein, and can prompt the user (e.g., by providing a push notification) to accept the modified configuration.

In some examples, automatic determination of the modified configuration can be executed substantially continuously, or discretely at predetermined time intervals (e.g., X times per month). In some examples, automatic determination of the modified configuration can be executed in response to a new application being downloaded to and installed on the computing device.

In some examples, prompting of the user to implement a modified icon configuration can be provided in response to a stimulus. For example, the computing device can be configured to prompt the user when a current configuration of icons (e.g., an initial configuration, or a previously modified configuration) is sufficiently dissimilar to the modified icon configuration. In this regard, the computing device can be configured to calculate the difference between the current configuration and the modified configuration (e.g., continuously or discretely). Other stimulus can also be used to provide prompting of the user. For example, the computing device can be configured to prompt the user when an optimization success metric (e.g., average amount of navigational user input over a particular time period) has degraded below a predetermined threshold.

As described in detail above, a current configuration can be replaced by a modified configuration that is determined based on one or more usage signals. In some examples, the modified configuration can be implemented as a "draft" that can be accepted (e.g., set to a current configuration), rejected (e.g., rolled back), and/or edited by the user. For example, the user can be presented with one or more draft GUI screen that arrange graphical representations based on a modified configuration. In the draft GUI screens, the graphical representations can be moved by the user to edit the proposed modified configuration. Additionally, if the user chooses not to modify the current configuration, an option can be provided to reject the proposed configuration. In some examples, graphical representations in the draft GUI screens can be displayed transparently (e.g., "ghosted), or otherwise presented in an altered form, to indicate to the user that the displayed pages are draft GUI screens. In some examples, graphical representations in the draft GUI screens are prevented from activating a corresponding application.

If the user chooses to accept the proposed modified configuration, the current configuration can be updated to the modified configuration. In some examples, after the modified configuration of icons has been accepted (e.g., the current configuration has been updated to the modified configuration, the computing device can continue to monitor usage signals. In some examples, the computing device is configured to suspend the monitoring of usage signals for a predetermined period of time, after implementing a modified configuration. In this manner, the user can be afforded time to become familiar with the newly configured GUI screens before usage information is again collected.

Figure 5B:
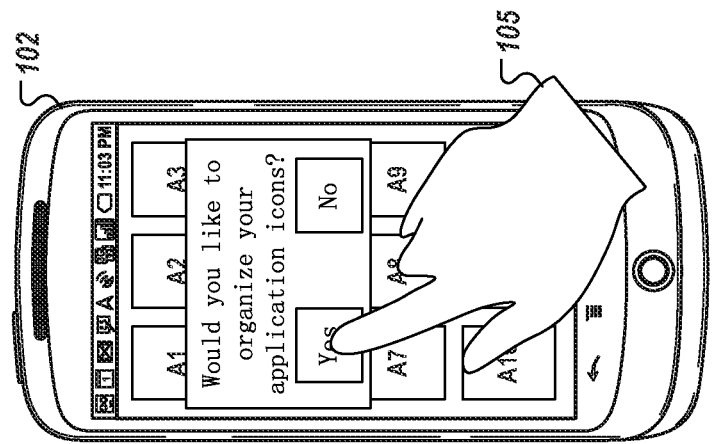
Figure 5A:
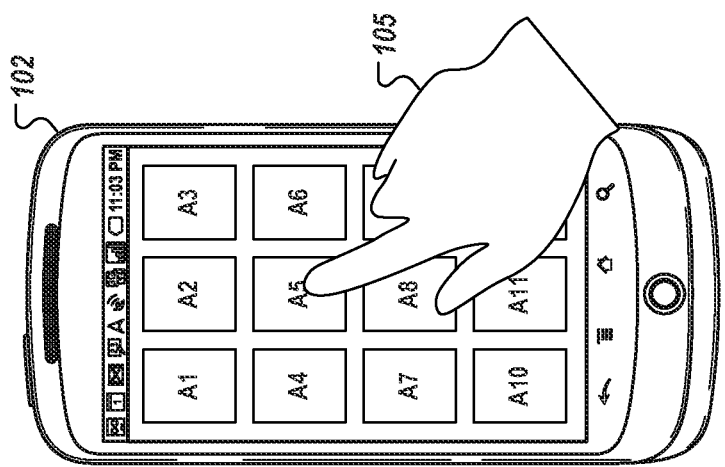
Figure 5D:
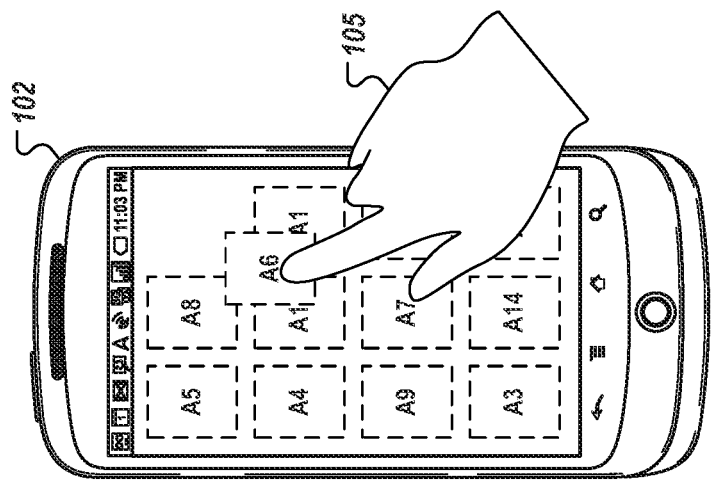
Figure 5C:
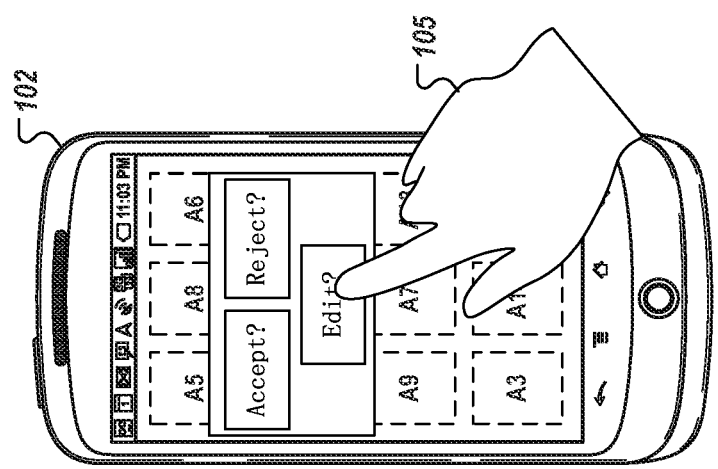

FIGS. 5A-5E depict sequential illustrations of a user interacting with an example mobile computing device according to one or more implementations of the present disclosure. FIG. 5A shows the user 105 activating the icon A5 by contacting the display region where the icon A5 is presented on the GUI screen. The application represented by the icon A5 is executed, in response to the activation event. User interaction with the launched application can be collected by the mobile computing device 102. As shown in FIG. 5B, the mobile computing device 102 can prompt the user 105 to re-organize the current configuration. In this example, the mobile computing device 102 provides a notification. Upon receiving confirmation that the user would like to re-organize the application icons, the computing device 102 can present a draft GUI screen to the user, as depicted in FIG. 5C. The draft GUI screen provides a proposed modified configuration of the application icons. The modified configuration can be determined based on one or more usage signals, as discussed herein. As shown, the application icons are presented in a ghosted form to indicate that the presented screen is a draft GUI screen. As noted above, the user 105 can choose to edit the draft GUI screen. For example, as shown in FIGS. 5C and 5D, the user can select an edit option from an interface and can drag-and-drop ghosted application icons in the draft GUI screen to modify the proposed configuration. The user can choose to accept the proposed configuration by selecting an accept option from the interface (see FIG. 5E), and in response, the current configuration can be set to the modified configuration (see FIG. 5F).

Figure 6:
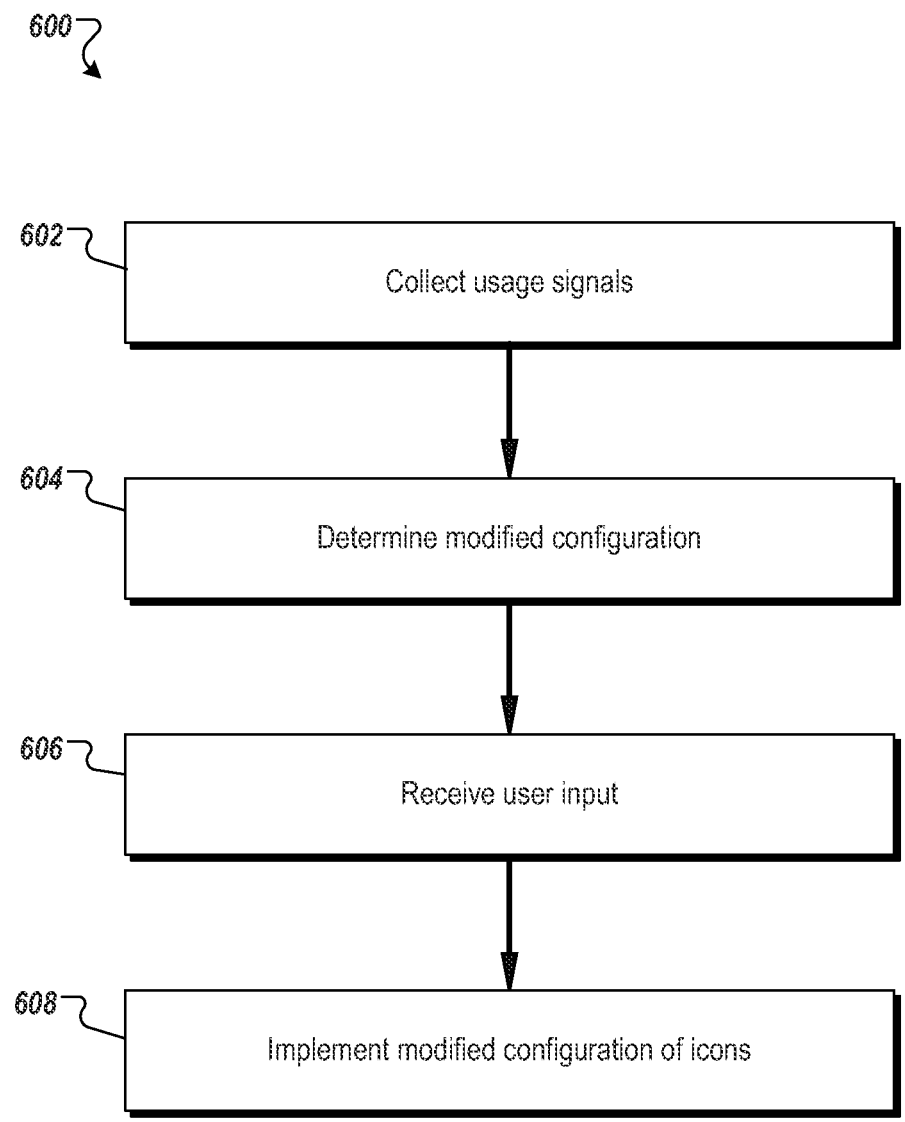
FIG. 6 depicts an example process for automatically organizing graphical representations on screens of computing devices.

FIG. 6 depicts an example process 600 for automatically organizing application icons. The example process 600 can be provided using one or more computer program applications executed on one or more computing devices. For example, the mobile computing device 102 and/or the server system 106 can be used to execute the example process 600.

Usage signals are collected (602). For example, the mobile computing device 102 can collect usage data by monitoring user interaction with installed applications. Further, in some examples, usage signals from other users can be collected to provide aggregated usage signals. A modified configuration for graphical representations displayed on one or more GUI screens is determined (604). The modified configuration can be determined based on the usage signals. For example, each application represented by an icon can be attributed a priority score determined based on the usage signals. The priority scores associated with the respective applications can be used to determine respective icon positions in the modified configuration. Further, in some examples, an optimization technique can be used to determine the modified configuration. User input is received (606). For example, a user can provide input by initiating re-organization of the current configuration, responding to a prompt provided by the mobile computing device 102 to re-organize the current configuration, and/or by editing a proposed modified configuration. The modified configuration can be implemented (608), based on the user input. For example, the user can accept the proposed modified configuration and, in response, the current configuration can be set to the proposed modified configuration. As another example, at least a portion of the modified configuration can be displayed in the GUI.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
    displaying, in a first arrangement on an electronic display of a computing device, at least a portion of a plurality of graphical representations of application programs, each respective graphical representation of the plurality of graphical representations being user selectable to execute a respective application program that corresponds to the respective graphical representation;
    identifying that a first graphical representation of a first application program from among the plurality of graphical representations of application programs has been accessed one or more times from within the first arrangement of graphical representations;
    determining a level of user input performed to access the first graphical representation the one or more times from within the first arrangement of graphical representations;
    generating a second arrangement of graphical representations of application programs, wherein the first graphical representation is provided at a location in the second arrangement of graphical representations that is determined to reduce a level of user input required to access the first graphical representation from within the second arrangement of graphical representations as compared to the level of user input performed to access the first graphical representation the one or more times from within the first arrangement of graphical representations; and
    displaying particular ones of the plurality of graphical representations of application programs, including the first graphical representation, on the electronic display of the computing device according to the second arrangement of graphical representations of application programs.

2. The computer-implemented method of claim 1, wherein the level of user input is an average level of user input performed to access the first graphical representation multiple times from within the first arrangement of graphical representations.

3. The computer-implemented method of claim 2, wherein the average level of user input indicates an average number of screen swipes performed to access the first graphical representation of the first application over the multiple times that the first graphical representation of the first application was accessed from within the first arrangement of graphical representations.

4. The computer-implemented method of claim 2, wherein the average level of user input indicates an average number of times that the computing device, responsive to user input, enters or exits one or more folders to access a particular folder in which the first graphical representation of the first application is located.

5. The computer-implemented method of claim 1, further comprising:
    for each of one or more application programs on the computing device including the first application, identifying at least one usage signal that indicates a measure of user interaction with the application program;
    determining, based on the at least one usage signal for the one or more application programs on the computing device, that at least one measure of user interaction with the first application is greater than at least one measure of user interaction with other ones of the one or more application programs; and
    in response to determining that the at least one measure of user interaction with the first application is greater than the at least one measure of user interaction with the other ones of the one or more application programs, prioritizing the location of the first graphical representation in the second arrangement of graphical application programs over locations of other graphical representations that correspond to the other ones of the one or more application programs.

6. The computer-implemented method of claim 5, wherein the at least one usage signal comprises a frequency of use signal that indicates a measure of how often a particular application corresponding to the at least one usage signal is accessed or opened over a period of time.

7. The computer-implemented method of claim 5, wherein the at least one usage signal comprises an interaction time signal that indicates at least one of (i) an accumulated runtime for a particular application corresponding to the at least one usage signal over a period of time, and (ii) an average application runtime for the particular application over multiple uses of the particular application.

8. The computer-implemented method of claim 5, wherein the at least one usage signal comprises an interaction frequency signal that indicates a measure of how often user input responds to notifications pushed out from a particular application corresponding to the at least one usage signal.

9. The computer-implemented method of claim 1, wherein the first arrangement of graphical representations of application programs on the computing device is determined based at least in part on one or more usage signals aggregated from a plurality of users that indicate respective measures of user interaction by the plurality of users with particular application programs that are graphically represented in the first arrangement of graphical representations.

10. The computer-implemented method of claim 1, wherein generating the second arrangement of graphical representations of application programs comprises assigning priority scores to each of a plurality of application programs on the computing device, ranking the plurality of application programs based on the priority scores, and arranging the graphical representations in the second arrangement of graphical representations of application programs on the computing device based on the ranking.

11. The computer-implemented method of claim 10, wherein the priority scores are determined based on one or more usage signals that indicate one or more measures of user interaction with the plurality of application programs.

12. The computer-implemented method of claim 1, further comprising determining that one or more application programs that have a corresponding graphical representation in the first arrangement of graphical representations are interacted with by users less than a threshold amount, and in response, excluding the graphical representations of the one or more application programs from the second arrangement of graphical representations of application programs on the computing device so that the graphical representations of the one or more application programs are not displayed in the second arrangement of graphical representations.

13. The computer-implemented method of claim 1, wherein generating the second arrangement of graphical representations of application programs on the computing device comprises determining that two or more application programs are assigned to a same or similar category of application programs, and in response, positioning graphical representations of the two or more application programs nearer each other in the second arrangement of graphical representations than if the two or more application programs were not assigned to the same or similar category of application programs.

14. The computer-implemented method of claim 1, further comprising prompting a user to at least one of (i) confirm whether to display the particular ones of the plurality of graphical representations of application programs on the computing device according to the second arrangement of graphical representations, and (ii) confirm whether to maintain the display of the particular ones of the plurality of graphical representations of application programs on the computing device according to the second arrangement of graphical representations.

15. The computer-implemented method of claim 1, wherein the location in the second arrangement of graphical representations at which the first graphical representation is provided is further selected based on a determination that providing the first graphical representation at the location is likely to minimize an interstitial time for a user to find the first graphical representation from among a display of multiple graphical representations of application programs.

16. One or more machine-readable storage devices having instructions stored thereon that, when executed by one or more processors, cause the one or more processors to perform operations comprising:
    displaying, in a first arrangement on an electronic display of a computing device, at least a portion of a plurality of graphical representations of application programs, each respective graphical representation of the plurality of graphical representations being user selectable to execute a respective application program that corresponds to the respective graphical representation;
    identifying that a first graphical representation of a first application program from among the plurality of graphical representations of application programs has been accessed one or more times from within the first arrangement of graphical representations;
    determining a level of user input performed to access the first graphical representation the one or more times from within the first arrangement of graphical representations;
    generating a second arrangement of graphical representations of application programs, wherein the first graphical representation is provided at a location in the second arrangement of graphical representations that is determined to reduce a level of user input required to access the first graphical representation from within the second arrangement of graphical representations as compared to the level of user input performed to access the first graphical representation the one or more times from within the first arrangement of graphical representations; and
    displaying particular ones of the plurality of graphical representations of application programs, including the first graphical representation, on the electronic display of the computing device according to the second arrangement of graphical representations of application programs.

17. The one or more machine-readable storage devices of claim 16, wherein the level of user input is an average level of user input performed to access the first graphical representation multiple times from within the first arrangement of graphical representations.

18. The one or more machine-readable storage devices of claim 16, wherein the operations further comprise:
    for each of one or more application programs on the computing device including the first application, identifying at least one usage signal that indicates a measure of user interaction with the application program;
    determining, based on the at least one usage signal for the one or more application programs on the computing device, that at least one measure of user interaction with the first application is greater than at least one measure of user interaction with other ones of the one or more application programs; and
    in response to determining that the at least one measure of user interaction with the first application is greater than the at least one measure of user interaction with the other ones of the one or more application programs, prioritizing the location of the first graphical representation in the second arrangement of graphical application programs over locations of other graphical representations that correspond to the other ones of the one or more application programs.

19. The one or more machine-readable storage devices of claim 16, wherein the first arrangement of graphical representations of application programs is determined based at least in part on one or more usage signals aggregated from a plurality of users that indicate respective measures of user interaction by the plurality of users with particular application programs that are graphically represented in the first arrangement of graphical representations.

20. The one or more machine-readable storage devices of claim 16, wherein the location in the second arrangement of graphical representations at which the first graphical representation is provided is further selected based on a determination that providing the first graphical representation at the location is likely to minimize an interstitial time for a user to find the first graphical representation from among a display of multiple graphical representations of application programs.

* * * * *